Dec. 29, 1953  J. H. PROWINSKY  2,664,296
TIRE FOR BOMB TRUCKS
Filed Nov. 9, 1951  2 Sheets-Sheet 1

FIG. I

INVENTOR
JOSEPH H. PROWINSKY
BY
ATTORNEYS

Dec. 29, 1953   J. H. PROWINSKY   2,664,296
TIRE FOR BOMB TRUCKS

Filed Nov. 9, 1951   2 Sheets-Sheet 2

INVENTOR
JOSEPH H. PROWINSKY

BY
ATTORNEYS

Patented Dec. 29, 1953

2,664,296

UNITED STATES PATENT OFFICE 2,664,296

TIRE FOR BOMB TRUCKS

Joseph H. Prowinsky, Washington, D. C.

Application November 9, 1951, Serial No. 255,722

10 Claims. (Cl. 280—29)

(Granted under Title 35, U. S. Code (1952), sec. 266)

The present invention relates to tire treads, and more particularly to tire treads for solid or semi-solid tires of the type used on heavy loaded vehicles such as trucks or high lift trucks for handling bombs, torpedoes and the like, which in the course of their operation must be pulled over cables, ropes and the like. These vehicles must use wheels of relatively small diameters to provide for proper maneuvering of the vehicles and this greatly increases the force necessary to move the vehicles across the cables.

Vehicles currently engaged in moving extremely heavy loads over cables, ropes or the like, particularly vehicles of the above-mentioned type, are equipped with smooth tread tires, or tires whose grooves in the tread portions are of such relatively shallow radial depth and width that a maximum of effort must be exerted in order to pass the vehicle over the cables. This is particularly true where bomb trucks or high lift bomb trucks having wheels of relatively small diameter and carrying heavy bombs must be pulled across greased, tensioned, arresting cables which are stretched transversely across the flight decks of aircraft carriers. When, in the above case, conventional tires are used, the wheels, upon contact with the greased cables, will push or slide the cables along the deck in front of the wheels until the cables can move no further. During the sliding of the cable, the cable tension increases and the approach speed of the vehicle is reduced to practically a standstill, at which time the crew must move the vehicle over the taut cable by brute force.

The present invention overcomes the above disadvantage by providing in solid or semi-solid tires a tread portion composed of angularly arranged semi-circular grooves of such radial depth and width that the cables will be gripped by the tread and partially embraced thereby substantially immediately upon contact therewith, thus allowing the vehicle to be passed over the cables with little effort.

It is therefore one object of the present invention to provide a tread for solid or semi-solid tires which will facilitate the movement of heavy, loaded or empty, wheeled vehicles across obstructions such as cables, ropes and the like.

A further object of the invention is to provide a tread for solid or semi-solid tires which is so configured that it will grip and partially embrace a cable substantially immediately upon contact therewith and thereby allow the vehicle to pass over the cable with a minimum of effort.

Other objects and advantages of the invention will hereinafter become more fully apparent from the following description of the annexed drawings, which illustrate a preferred embodiment, and wherein.

Figure 1:
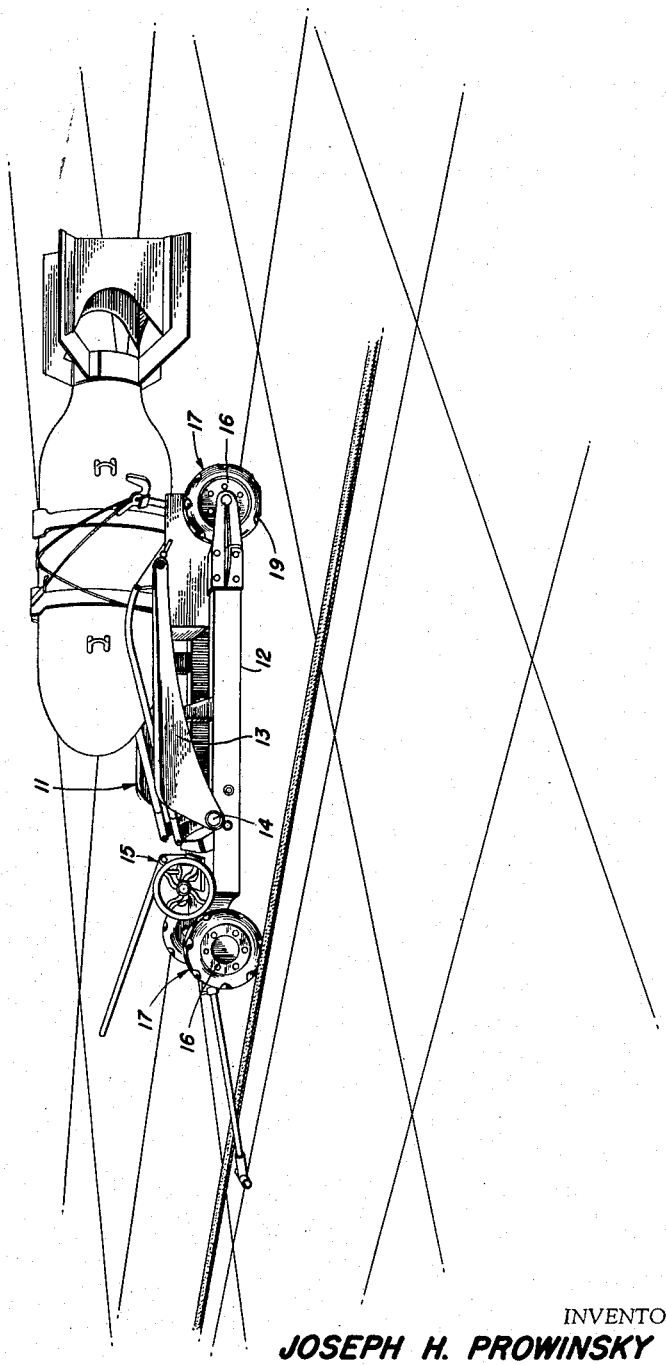
Figure 1 is a perspective view of a high lift bomb truck including wheels provided with tires embodying the invention; said vehicle being shown approaching a cable prior to crossing same.
Figure 2:
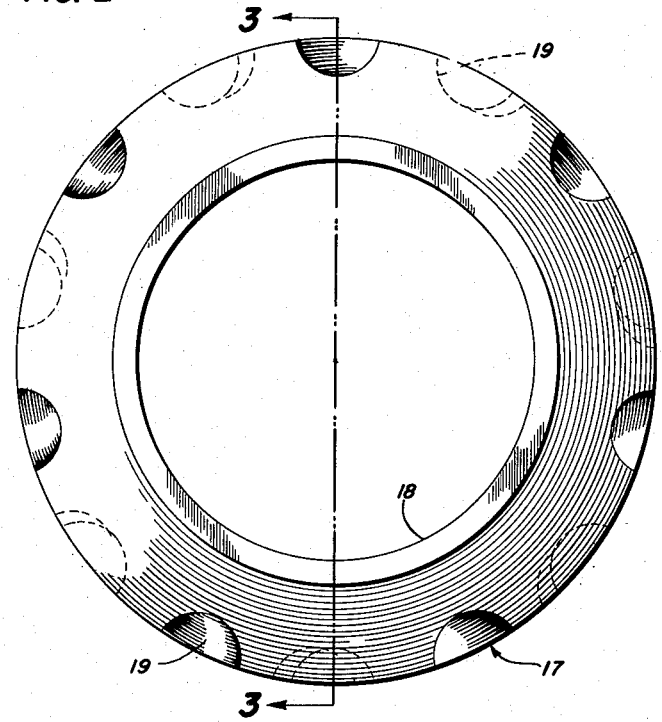
Figure 2 is a side elevational view of the tire and rim assembly.
Figure 3:
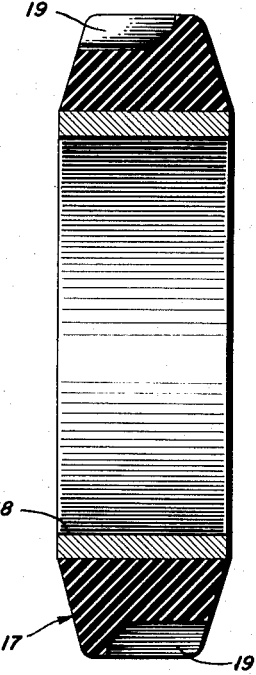
Figure 3 is a sectional view of the assembly taken along the line 3—3 of Figure 2.
Figure 4:
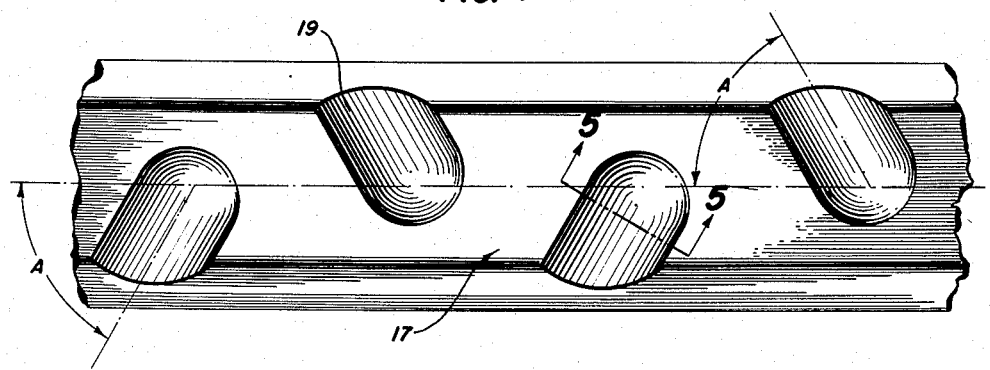
Figure 4 is an enlarged developed plan view of the tread portion of the tire.
Figure 5:
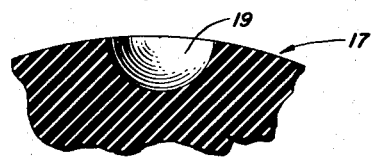
Figure 5 is a fragmentary sectional view taken along the line 5—5 of Figure 4.

Referring now to the drawings, wherein like reference characters designate like or corresponding parts throughout the several views, there is shown in Figure 1 a high lift bomb truck 11 comprising a rectangular frame 12, a pair of lifting arms 13 pivotally connected by suitable means 14 to the forward portion of the frame, and a hydraulic lifting mechanism 15 located on the frame 12 between the arms 13 and adapted to raise and lower or move the arms between vertical and horizontal positions. Rotatively attached to each of the four corners of the rectangular frame member 12 are wheels 16 having tires 17 thereon embodying the invention disclosed herein. The wheels 16 have diameters of about 13".

As shown in Figures 2–5, the tire assembly is composed of a circular rim 18 of any suitable material surrounded by a relatively thick substantially solid tire 17 of solid or semi-solid rubber or other material having similar properties. The tire 17 has around its outer periphery a tread portion which is provided with staggered, semi-cylindrical grooves 19 extending alternately from the opposite lateral edges of the tread portion obliquely inward counter to the direction of normal rotation of said tire during forward travel of said truck to a point preferably slightly beyond the center line of the tread, alternate grooves being oppositely or reversely inclined relative to the center line of the tread.

In order to provide the proper gripping action in the tires, the grooves must be of such width and depth that the cables, when contacted, can be gripped therein. If the grooves are too narrow, the cable will be passed over by the grooves as though the tread were smooth, and no gripping action will take place. Similarly, if the grooves are too shallow the cable will be pushed out of the groove by the root or base of the groove before it can be gripped therein. It is imperative therefore, that the grooves have a radius at least equal to substantially one half the diameter of the cable. It has been found that grooves having a radius of ¾" will perform efficiently with cables having diameters up to 1½", for example.

The angle A at which the grooves are inclined relative to the center line of the tread may vary. However, the groove angle A must be such that it will permit the vehicle to cross the cable one wheel at a time. In no instance should the grooves be so angled that both of the front or both of the rear wheels must cross simultaneously. It will thus be seen that in vehicles where the wheels are spaced relatively far apart, the minimum groove angle A will be greater than that where the wheels are spaced relatively close together. It has been found that in vehicles where the wheel tracks are between two to three and one half feet, a groove angle of 60° relative to the center line of the tread is satisfactory.

The number of grooves made in the tread is optional between preferred limits. It can be seen that too many grooves would produce objectionable vibration in the vehicle when the wheels are moved over supporting surfaces, while too few grooves would result in too long a delay in gripping by the tire should the cable miss a groove immediately upon contact therewith. It has been found that for wheels of 13" diameter two rows of seven grooves each provide a balanced performance.

In actual operation the vehicle approaches the cable in such a manner that the tires will contact said cable at approximately the same angle as that between the groove and the center line of the tread, as seen in Figure 1. Upon contact, the cable will be either immediately gripped by a groove, or momentarily pushed slightly forward by the wheel until a groove is engaged, whereby the cable will then be gripped and partially embraced by the tire allowing the vehicle to pass over it with a minimum of pulling force.

As previously explained, the grooves are so angled in the tread that the wheels may be passed over the cables one at a time, regardless of the width of the wheel track, thus greatly reducing the pulling force required. Moreover, since the grooves are formed on both sides of the tread the vehicle is not limited to a single direction of crossing but may cross the cable from either of two general directions depending, of course, on which of the rows of grooves has been selected for use.

It should be understood, of course, that the foregoing disclosure relates to only a preferred embodiment of the invention and that numerous duplications or alterations may be made therein without departing from the spirit and the scope of the invention.

The invention described herein may be manufactured and used by or for the Government of the United States of America for governmental purposes without the payment of any royalties thereon or therefor.

Having thus described the invention, what is claimed is:

1. The combination with a lift truck of the type used on aircraft carriers and which must be pulled over aircraft arresting cables normally stretched transversely across the carrier's deck, said cables each having a diameter of about 1½", said truck comprising a frame, lifting arms, a mechanism actuating said arms, and wheels supporting said frame, said wheels having a track within the range of between 2–3½'; of a rim having a substantially solid tire mounted thereon for each of said wheels, each of said tires having around its outer periphery a tread portion provided with cable gripping walls defined by staggered substantially semi-cylindrical grooves extending alternately from the opposite lateral edges of the tread portion inwardly and obliquely counter to the direction of normal travel of said tire in crossing one of said cables to a point slightly beyond the centerline of the tread, said alternate grooves being oppositely or reversely inclined at an angle of about 60° relative to said centerline and having a radius equal to substantially one-half the diameter of the cables, whereby when said wheels approach a cable at an angle of about 60° as defined by the axis of said cable and the plane of the centerline of said tread, substantially immediately upon contact of one of said tires with said cable, the cable will be gripped and partially embraced by the walls defining one of said grooves thus enabling the truck to be pulled over the cable one wheel at a time with a minimum of effort.

2. The combination with a bomb truck of the type used on aircraft carriers and which must be pulled over aircraft arresting cables normally stretched transversely across the carrier's deck, said cables each having a diameter of about 1½", said truck comprising a frame, and wheels supporting said frame, said wheels having a track within the range of between 2–3½'; of a rim having a substantially solid tire mounted thereon for each of said wheels, each of said tires having around its outer periphery a tread portion provided with cable gripping walls defined by staggered substantially semi-cylindrical grooves extending alternately from the opposite lateral edges of the tread portion inwardly and obliquely counter to the direction of normal travel of said tire in crossing one of said cables to a point slightly beyond the centerline of the tread, said alternate grooves being oppositely or reversely inclined at an angle of about 60° relative to said centerline and having a radius equal to substantially one half the diameter of the cables, whereby when said wheels approach a cable at an angle of about 60° as defined by the axis of said cable and the plane of the centerline of said tread, substantially immediately upon contact of one of said tires with said cable, the cable will be gripped and partially embraced by the walls defining one of said grooves thus enabling the truck to be pulled over the cable one wheel at a time with a minimum of effort.

3. The combination with a bomb truck of the type used on aircraft carriers and which must be pulled over aircraft arresting cables normally stretched transversely across the carrier's deck, said cables each having a diameter of about 1½", said truck comprising a frame, and wheels supporting said frame; of a rim having a substantially solid tire mounted thereon for each of said wheels, each of said tires having around its outer periphery a tread portion provided with cable gripping walls defined by staggered substantially semi-cylindrical grooves extending inwardly and alternately from the opposite lateral edges of the tread portion and obliquely counter to the direction of normal travel of said tire in crossing one of said cables, said alternate grooves being oppositely or reversely inclined at an angle of about 60° relative to said centerline and having a radius equal to substantially one-half the diameter of the cables, whereby when said wheels approach a cable at an angle of about 60° as defined by the axis of said cable and the plane of the centerline of said tread, substantially immediately upon contact of one of said tires with said cable, the cable will be gripped and partially embraced by the walls defining one of said grooves thus enabling the truck to be pulled over the cable one wheel at a time with a minimum of effort.

4. The combination with a bomb truck of the type used on aircraft carriers and which must be pulled over aircraft arresting cables normally stretched transversely across the carrier's deck, said cables each having a diameter of about 1½", said truck comprising a frame, and wheels supporting said frame; of a rim having a substantially solid tire mounted thereon for each of said wheels, each of said tires having around its outer periphery a tread portion provided with cable gripping walls defined by staggered substantially semi-cylindrical grooves extending alternately from the opposite lateral edges of the tread portion inwardly and obliquely counter to the direction of normal travel of said tire in crossing one of said cables to a point slightly beyond the centerline of the tread, said alternate grooves being oppositely or reversely inclined relative to said centerline and having a radius equal to substantially one-half the diameter of the cables, whereby substantially immediately upon contact of one of said tires with said cable, the cable may be gripped and partially embraced by the walls defining one of said grooves thus enabling the truck to be pulled over the cable with a minimum of effort.

5. The combination with a bomb truck of the type used on aircraft carriers and which must be pulled over relatively large aircraft arresting cables normally stretched transversely across the carrier's deck, said truck comprising a frame, and wheels supporting said frame; of a rim having a substantially solid tire mounted thereon for each of said wheels, each of said tires having around its outer periphery a tread portion provided with cable gripping walls defined by staggered grooves extending alternately from the opposite lateral edges of the tread portion inwardly and obliquely counter to the direction of normal travel of said tire in crossing one of said cables to a point slightly beyond the centerline of the tread, said alternate grooves being oppositely or reversely inclined at an angle of about 60° relative to said centerline and having a radius equal to substantially one-half the diameter of the cables whereby when said wheels approach a cable at an angle of about 60° as defined by the axis of said cable and the plane of the centerline of said tread, substantially immediately upon contact of one of said tires with said cable, the cable will be gripped and partially embraced by the walls defining one of said grooves thus enabling the truck to be pulled over the cable one wheel at a time with a minimum of effort.

6. A substantially solid tire for use on a bomb truck of the type used on aircraft carriers and which must be pulled over aircraft arresting cables normally stretched transversely across the carrier's deck, said cables each having a diameter of about 1½", said tire having around its outer periphery a tread portion provided with cable gripping walls defined by staggered substantially semi-cylindrical grooves extending alternately from the opposite lateral edges of the tread portion inwardly and obliquely counter to the direction of normal travel of said tire in crossing one of said cables to a point slightly beyond the centerline of the tread, said alternate grooves being oppositely or reversely inclined at an angle of about 60° relative to said centerline and having a radius equal to substantially one half the diameter of the cables, whereby when said tire approaches a cable at an angle of about 60° as defined by the axis of said cable and the plane of the centerline of said tread, substantially immediately upon contact of said tire with said cable, the cable will be gripped and partially embraced by the walls defining one of said grooves on said tire thus enabling the tire to pass over the cable with a minimum of effort.

7. A substantially solid tire for use on a bomb truck of the type used on aircraft carriers and which must be pulled over aircraft arresting cables normally stretched transversely across the carrier's deck, said cables each having a diameter of about 1½", said tire having around its outer periphery a tread portion provided with cable gripping walls defined by staggered substantially semi-cylindrical grooves extending inwardly and alternately from the opposite lateral edges of the tread portion and obliquely counter to the direction of normal travel of said tire in crossing one of said cables, said alternate grooves being oppositely or reversely inclined at an angle of about 60° relative to said centerline and having a radius equal to substantially one-half the diameter of the cables, whereby when said tire approaches a cable at an angle of about 60° as defined by the axis of said cable and the plane of the centerline of said tread, substantially immediately upon contact of said tire with said cable, the cable will be gripped and partially embraced by the walls defining one of said grooves on said tire thus enabling the tire to pass over the cable with a minimum of effort.

8. A substantially solid tire for use on a bomb truck of the type used on aircraft carriers and which must be pulled over aircraft arresting cables normally stretched transversely across the carrier's deck, said cables each having a diameter of about 1½", said tire having around its outer periphery a tread portion provided with cable gripping walls defined by staggered substantially semi-cylindrical grooves extending alternately from the opposite lateral edges of the tread portion inwardly and obliquely counter to the direction of normal travel of said tire in crossing one of said cables to a point slightly beyond the centerline of the tread, said alternate grooves being oppositely or reversely inclined relative to said centerline and having a radius equal to substantially one-half the diameter of the cables, whereby substantially immediately upon contact of said tire with one of said cables, the cable will be gripped and partially embraced by the walls defining one of said grooves on said tire thus enabling the tire to pass over the cable with a minimum of effort.

9. A substantially solid tire for use on a bomb truck of the type used on aircraft carriers and which must be pulled over relatively large aircraft arresting cables normally stretched transversely across the carrier's deck, said tire having around its outer periphery a tread portion provided with cable gripping walls defined by staggered grooves extending alternately from the opposite lateral edges of the tread portion inwardly and obliquely counter to the direction of normal travel of said tire in crossing one of said cables to a point slightly beyond the centerline of the tread, said alternate grooves being oppositely or reversely inclined at an angle of about 60° relative to said centerline and having a radius equal to substantially one-half the diameter of the cables, whereby when said tire approaches a cable at an angle of about 60° as defined by the axis of said cable and the plane of the centerline of said tread, substantially immediately upon contact of said tire with said cable, the cable will be gripped and partially embraced by the walls defining one of said grooves on said tire thus enabling the tire to pass over the cable with a minimum of effort.

10. A substantially solid tire for use on a bomb truck of the type used on aircraft carriers and which must be pulled over relatively large aircraft arresting cables normally stretched transversely across the carrier's deck, said tire having around its outer periphery a tread portion provided with cable gripping walls defined by staggered substantially semi-cylindrical grooves extending inwardly and alternately from the opposite lateral edges of the tread portion and obliquely counter to the direction of normal travel of said tire in crossing one of said cables, said alternate grooves being oppositely or reversely inclined relative to said centerline and having width and depth sufficient to receive one of said cables, whereby substantially immediately upon contact of said tire with one of said cables, the cable may be gripped and partially embraced by the walls defining one of said grooves on said tire thus enabling the tire to pass over the cable with a minimum of effort.

JOSEPH H. PROWINSKY.

References Cited in the file of this patent

UNITED STATES PATENTS

| Number | Name | Date |
|---|---|---|
| 1,208,902 | Boyd | Dec. 19, 1916 |
| 2,454,840 | Ryan | Nov. 30, 1948 |

FOREIGN PATENTS

| Number | Country | Date |
|---|---|---|
| 18,385 | Great Britain | 1897 |
| 28,087 | Great Britain | 1907 |